United States Patent
Leitz et al.

[11] 3,781,110
[45] Dec. 25, 1973

[54] OPTICAL RANGE FINDING SYSTEM

[75] Inventors: Ludwig Leitz; Knut Heitmann; Eckart Schneider, all of Wetzlar, Germany

[73] Assignee: Ernst Leitz GmbH, Wetzlar, Germany

[22] Filed: Nov. 15, 1972

[21] Appl. No.: 306,535

[30] Foreign Application Priority Data
Nov. 15, 1971 Germany.............. P 21 56 617.6

[52] U.S. Cl. ............. 356/4, 95/44 C, 250/201, 250/237 G
[51] Int. Cl. ............................................. G01c 3/08
[58] Field of Search ........................ 356/4, 5, 28; 250/237 G, 201; 95/44 C

[56] References Cited
UNITED STATES PATENTS

| 3,706,492 | 12/1972 | Roblin et al. | 356/5 |
| 3,054,898 | 9/1962 | Westover et al. | 356/4 |
| 3,482,107 | 12/1969 | Hock | 250/237 G |
| 2,887,019 | 5/1959 | Dodin | 95/44 C |
| 2,881,686 | 4/1959 | Ruhle | 95/44 C |
| 3,274,913 | 9/1966 | Biedermann et al. | 356/4 |

FOREIGN PATENTS OR APPLICATIONS

| 1,249,302 | 10/1971 | Great Britain | 356/28 |
| 1,208,505 | 10/1970 | Great Britain | 356/152 |

*Primary Examiner*—Benjamin A. Borchelt
*Assistant Examiner*—S. C. Buczinski
*Attorney*—Gilbert L. Wells

[57] ABSTRACT

An optical range finding system wherein a local frequency component of the image of an object is generated and the position of the plane of maximum amplitude of the frequency component is established by an objective to produce the image, a grating located in the image space, a beam splitter for splitting the image into two components and photoelectric detectors receiving radiation which has been modulated by the grating. The radiation constitutes at least part of each of the frequency components and the detecting means supply signals to a push-pull amplifier having a frequency equal to the local frequency. These signals are indicative of the position of the plane of maximum amplitude.

22 Claims, 18 Drawing Figures

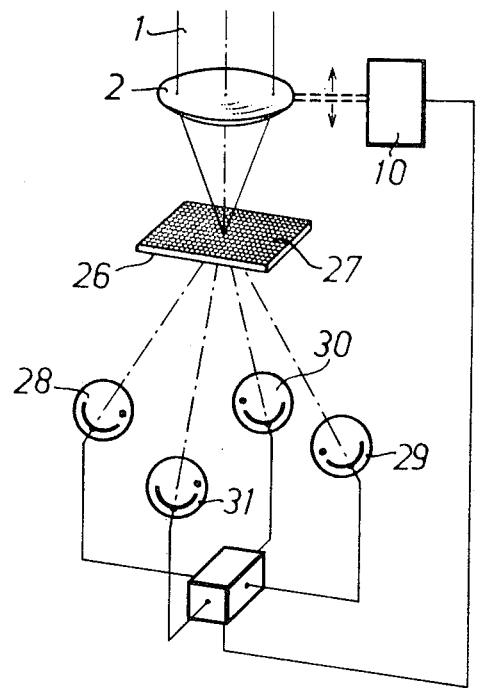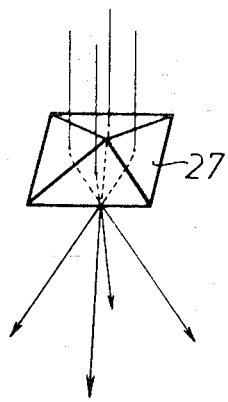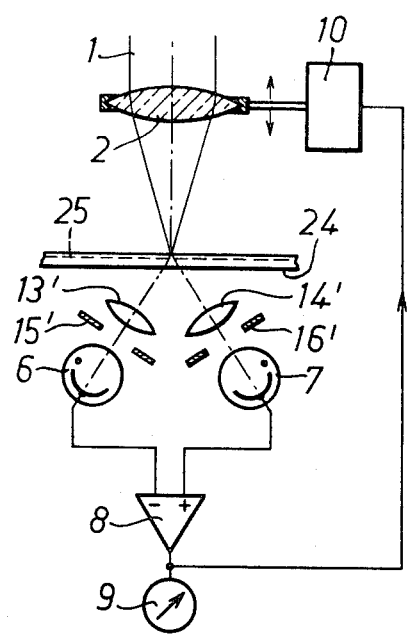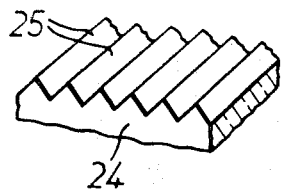
Fig. 5
Fig. 5a
Fig. 4
Fig. 4a

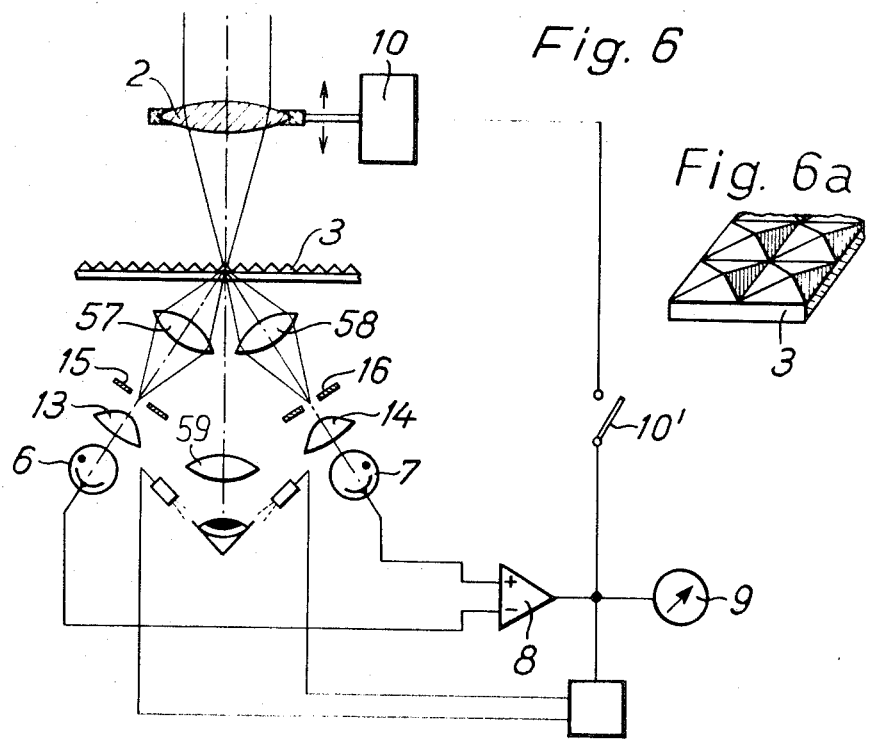
Fig. 6
Fig. 6a
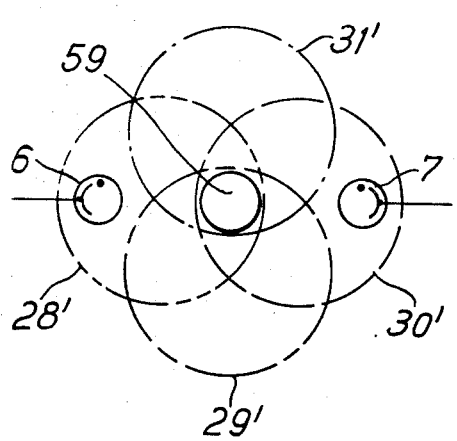
Fig. 7
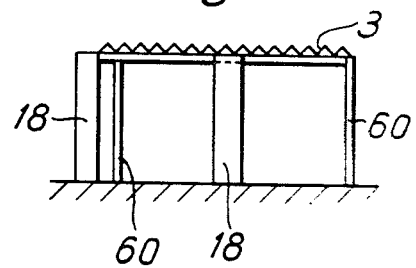
Fig. 8

OPTICAL RANGE FINDING SYSTEM

CROSS REFERENCES TO RELATED APPLICATIONS

Applicants claim priority under 35 U.S.C. 119 for Applications Serial Nos. P 2 156 617.6 and P 2 201 092.0 filed Nov. 15, 1971 and Jan. 11, 1972 respectively, in the Patent Office of the Federal Republic of Germany.

BACKGROUND OF THE INVENTION

The field of the invention is optics, measuring and testing with range or remote distance finding using a light detector.

The invention is particularly related to an image testing device for determining the position of the plane of maximum amplitude of a local frequency associated with an image.

The state of the prior art may be ascertained by reference to West German Pat. Nos. 742,220 of Hans Rühle et al.; 927,239 of Rudolf Sewig; 961,767 of Herbert Kunz et al.; and 1,103,050 of Fromond Hock; and U.S. Pat. Nos. 2,254,548 of Hans Rühle et al.; 3,054,898 of Westover et al. and 3,682,071 of Hosoe.

In one system for the sharp focusing of the objective images formed by optical systems, the image of a test object influences a photoelectric element. The bright and dark fields of the preferably raster-like test image of the object are projected onto the photoelectric element alternately in quick succession through a preferably slit-like diaphragm. However, on the one hand only specially prepared test images of an object may be sharply focused, and on the other hand a considerable expenditure of cost may be necessary, since a component which is moved quickly by mechanical means is used. This system is disclosed in West German Pat. No. 927,239 of Rudolf Sewig.

In another system for the sharp focusing of the objective images formed by optical systems, there are bright and dark fields of two raster-like test images of an object and one is disposed closely in front of, and the other closely behind, the focal plane. These images are projected alternately to a photoelectric element in quick succession, through a slit diaphragm. The gradient of trapezoidal current pulses occurring at the output of the photoelectric element serves as a measure of the sharpness of focusing. The focusing of the optical system is altered until equality of all such gradients is achieved. The construction of this system may similarly require elements which are quickly moved mechanically and which must also be situated at the position of the object to be measured. This construction may be difficult to make. Such a system is disclosed in German Pat. No. 961,767 of Herbert Kunz et al.

The setting of optical imaging systems by means of autocollimation is carried out by setting the objective to the optimum value of image sharpness by means of a photoelectric cell. The photoelectric cell is arranged in front of an auto-collimation telescope or at the position of the telescope. The light originating from a light source is projected through the objective to be investigated onto the light sensitive surface of the cell at such an intensity that at precise superposition of two test images of an object a maximum or a minimum of the photo-cell current occurs. This current serves as a criterion for the setting of the objective. This arrangement may only be employed for previously prepared and positioned test objects and this may be inconvenient in distance determinations with respect to arbitrarily distant objects. U.S. Pat. No. 2,254,548 and West German Pat. No. 742,220 disclose such a system.

The light bundle passing through an optical system is split up into two components in such a manner that the separation plane of the components contains the optical axis in another arrangement for the sharp focusing of optical systems. A Foucault knife edge displaceable along the optical axis relative to the system is used to locate the position in which the knife edge influences the brightness of the two components to the same degree which is determined photoelectrically. In the image correlation of arbitrary object structures, this method is used hardly at all, because of inhomogeneous brightness distribution. Such a system is disclosed in West German Pat. No. 1,103,050.

In some electro-optical (optronic) focusing systems for reflex cameras, a portion of the light from the objective pupil is branched off by means of a ring mirror, and then fed to a scanning arrangement with a movable diaphragm and movable photoelectric detectors. However, the beam component branched off for the focusing arrangement cannot be used for recording. At the same time, there is only a very small, almost point- or slit-like section of the image of the object measured. As a result of this a large diameter component is used for the measurement to reach sufficiently high light-fluxes and correspondingly to make the product of the field of vision and aperture adopt a high value, at a given minimum field of vision, and the image is thus not available for other purposes. Moreover, with objectives of different apertures and different focal lengths, a specific focusing arrangement is needed in each case and this arrangement is adapted to the objective. Such a design, however, may involve considerable costs.

U.S. Pat. No. 3,054,898 discloses an infrared ranging system having a concave mirror for converging the infrared rays to a focal point, a pair of prisms for splitting the rays into two images, photoelectric detectors for receiving the split images and a push-pull amplifier coupled to an electric motor adjusting the focus of the prisms to bring the images into an equilibrium condition as determined by the detectors.

According to U.S. Pat. No. 3,682,071 an automatic focusing system is disclosed for cameras wherein a spot of light is projected from the camera, a lens with an adjustable focus located in the camera receives an image of the spot, the image is split into two components by an optical system where the two components have an apparent parallax except when the object is sharply in focus, two photoelectric cells for receiving the components and a push-pull amplifier coupled to an electric motor for adjusting the focus of the lens until the object is sharply in focus as a response to the outputs of the photoelectric cells.

SUMMARY OF THE INVENTION

According to the invention, a local frequency component of the image of an object is generated and the position of the plane of maximum amplitude of the local frequency component is determined by an objective to produce the image, at least one grating situated in the image plane of the objective, beam splitting means to split the image into at least two components, and photoelectric detecting means to receive radiation which has been modulated by the grating. The radiation constitutes at least part of each of the components and the detecting means supply push-pull electrical signals of frequency equal to the local frequency. These signals are indicative of the position of the plane of maximum amplitude.

Preferably, the detecting means comprise a pair of photoelectric detectors, the beam splitting means comprise polarizing splitting means between the objective and the grating and a polarization analyser to direct the radiation of at least part of each component to one of the detectors respectively.

Conveniently, the detecting means comprise a pair of photoelectric detectors, the beam splitting means comprise a dispersion prism between the objective and the grating and a color analyser to direct the radiation comprising at least part of each of the components to one of the detectors respectively.

Suitably, the beam splitting means comprise successive rows of prisms constituting the grating. The prisms each have saw tooth configuration and the apical edges of the prisms of each row are parallel to each other and perpendicular to the direction of the length of that row. The prisms of each row have an opposite orientation to the prisms of the adjacent row.

In one arrangement the grating is provided with a plurality of mutually parallel grooves of triangular cross-section. Preferably the grooves are defined by a plurality of prismatic elements carried by a support.

In another arrangement the grating comprises a plurality of geometrically similar pyramids having corresponding edges of their base surfaces parallel to one another. Preferably the detecting means comprise individual photoelectric detectors to receive the radiation from the respective sets of corresponding surfaces of the pyramids.

The detecting means may comprise a plurality of photoelectric detectors, an individual optical system of positive power and an individual alignment diaphragm. Each alignment diaphragm is disposed relative to the detectors so that each individual detector can receive radiation from only a given peripheral portion of the objective. Preferably two such peripheral portions are diametrically opposite to one another.

In another embodiment, the system comprises positioning means to vary the relative position of the objective and the grating under the control of electrical signals.

Indicating means connected to the outputs of the detecting means are contemplated.

Differential amplifying means connected to the outputs of the detecting means are included in the system.

The system can include an optical flasher connected to the output of the amplifying means.

Conveniently, the grating comprises a focusing screen in a reflex camera having an eyepiece to permit visual observation of the screen.

The system may include beam deflecting means between the screen and the detecting means. Preferably the deflecting means comprises a pentaprism.

According to the concept of the system, individual concave reflectors attached to the pentaprism are included in the paths of the radiation. These reflectors comprise at least part of each of the respective components to the detecting means.

Preferably, the objective is removably mounted and the deflecting means are capable of accommodating radiation from an objective of selectable aperture range.

The system may include mounting means which mount the screen resiliently relative to a support, and moving means to move the screen relative to the support in at least one coordinate direction.

Suitably, the screen comprises an aperiodic raster.

In one embodiment, the detecting means comprise a plurality of pairs of photoelectric detectors and switching means provided to switch individual pairs of the detectors selectably into and out of operation.

BRIEF DESCRIPTION OF THE DRAWINGS

Embodiments of the invention are particularly described with reference to the accompanying drawings, in which:

FIG. 4 is a schematic plan view showing a range system including a grating of prismatic form;

FIG. 4a is a perspective view showing the construction of the grating shown in FIG. 4.

FIG. 5 is a schematic plan view showing a ranging system for two-dimensional measurement;

FIG. 5a is a perspective view showing the construction of the grating shown in FIG. 5;

FIG. 6 is a schematic plan view showing a ranging system having the principle of a further embodiment of the invention;

FIG. 6a is a perspective view showing a portion of the grating of FIG. 6;

FIG. 7 is a schematic plan view showing the position of the exit pupil in the embodiment shown in FIG. 6;

FIG. 8 is a plan view showing the bearing and drive arrangement of the focusing screen of prismatic form useful in FIG. 6;

DESCRIPTION OF THE PREFERRED EMBODIMENTS

Figure 1:
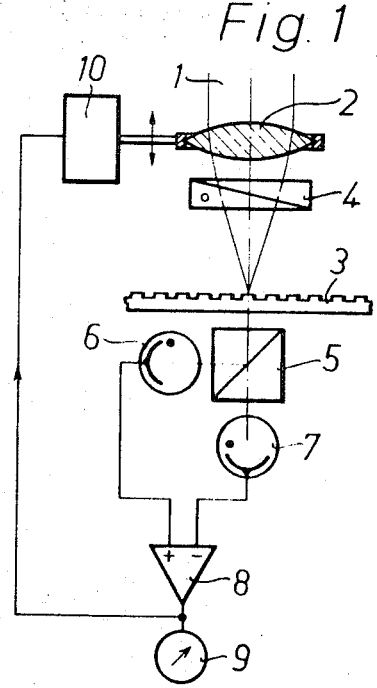
FIG. 1 is a schematic plan view showing a ranging system involving the use of a polarizing beam splitting.

In FIG. 1, the reference numeral 1 designates a light bundle coming from an object to be measured. From the optical properties of the light bundle the distance of the object is to be determined. The object is illuminated by conventionally employed light sources, for example daylight or artificial light. An objective 2 images the object in the plane of a grating 3. A wollaston prism 4 associated with the objective 2 generates by double refraction two object image components. These image components are displaced relative to one another in the plane of the grating 3 by half a grating constant in a direction perpendicular to the grating lines. The light of each individual image component, after filtering through the grating 3, is fed via a polarizing splitter 5 acting as an analyser to a respective photoelectric detector 6 or 7. The output signals of the detectors are fed to a push-pull amplifier 8. An instrument 9 for the indication of the maximum difference signal of the detectors 6 and 7 is disposed at the output of the amplifier 8.

Since the image components of the object show a locally variable brightness distribution, the detectors 6 and 7 receive different amounts of light. The detectors receive these different amounts of light because the grating 3 filters, as a local frequency filler, the frequency component corresponding to its grating constant out of the image distribution. This frequency component possesses an intensity maximum when the image component of the object to be measured is imaged sharply in the plan of the grating 3. As a result of the relative movement between the grating and the image, which may be generated stochastically by movements or vibrations of the user of the rangefinder, a time-variable signal of maximum amplitude occurs at the output of the push-pull amplifier 8 in the condition of sharp focusing. The frequency of the time-variable signal is proportional to the speed of the relative movement. In accordance with this signal, the image sharpness is regulated optimally by means of a regulator 10 and the objective 2. The distance can then be read off for example on a scale associated with the regulator 10.

By superimposing the object structure on the structure of the grating 3, the filtering out of the image structure components corresponding to the local frequency of the grating is achieved. At the same time, additional low frequency image components are transmitted as an interfering constant light component. For the other image component, displaced by half a grating constant, the same applies, but with the difference that only the local frequency corresponding to the grating constant is displaced in phase relative to the first-mentioned local frequency signal by 180°. By the subsequent differential treatment of the electrical signals gained from the two image components, elimination of the equal phase constant light components and addition of the contra-phase signal components of the filtered out local frequency are automatically obtained.

It is possible instead of using the principle of polarizing splitting of the two image components to use color splitting by means of a color dispersion prism and a dichromatic splitter. The prism and splitter replace the elements 4 and 5 of FIG. 1.

Figure 2:
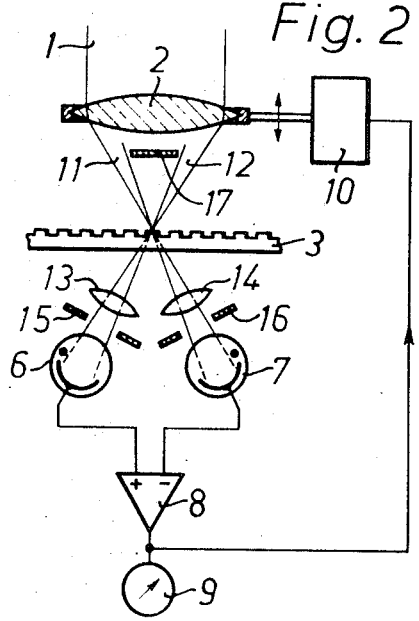
FIG. 2 is a schematic plan view showing a ranging system with accurately directed photoelectric detectors.

The embodiment shown schematically in FIG. 2 has the elements numbered with reference numerals 1 to 3 and 6 to 10, with similar function and designation as in the arrangement shown in FIG. 1. In contrast to the last-mentioned arrangement, here however beam components of the bundle 1 having passed diametrically opposite portions 11 and 12 of the objective 2 strike in each case the different photoelectric detectors 6 and 7. This is achieved by an individual collecting optical system 13, 14 of positive power as well as an alignment diaphragm 15, 16. Each of the diaphragms is associated with one of the photoelectric detectors 6 and 7 disposed behind the correlating grating 3. The constructional elements 6, 7 and 13 to 16 possess a corresponding spatial arrangement in relation to the principal axis of the objective 2. The components of the bundle 1 near the axis are kept away from the measuring arrangement by a diaphragm 17. The excluded components can serve for example for photographic image evaluation. When the image and the grating plane have the same position, the instrument 9 indicates a null passage of the differential signal, since the elements 6 and 7 then receive equal amounts of light. With a shifting of the point of intersection of the light components out of the grating plane, the two photoelectric detectors 6 and 7 on the other hand are acted upon differently. This applies for all image points which are so disposed in the image as to be fixed relative to one another, i.e., "coherently," but which can move together with time and by happenstance.

Figure 3:
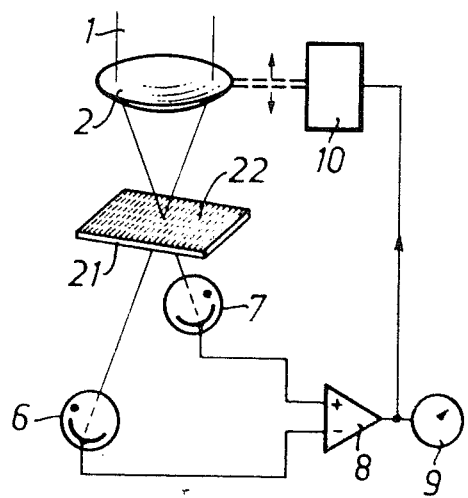
FIG. 3 is a schematic plan view showing a ranging system with a special raster as a correlator.
Figure 3A:
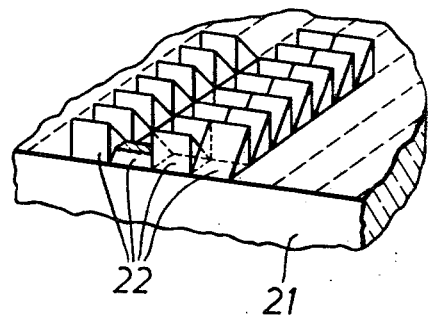
FIG. 3a is a perspective view showing the construction of the grating shown in FIG. 3.

In FIG. 3, a further embodiment is shown schematically. It has the elements of FIG. 1 designated with numerals 1, 2 and 6 to 10 with analogous function. However, the correlating grating 21 consists of rows of sawtooth-shaped prisms 22 oppositely directed from line to line (see FIG. 3a). The apical edges of the prisms of each row are parallel to each other and perpendicular to the direction of the length of the row. The splitting up of the energy between the image components of the object displaced relative to one another by half a grating constant is therefore not generated by means of a polarization optical system, but by the different light diffraction given by the oppositely directed prisms. The push-pull signal generated is equivalent to that given with the arrangement according to FIG. 1, in relation to the local frequency of the image components of the object.

In FIG. 4, a modification of the embodiment shown in FIG. 3 is represented. Here also, similar reference numerals refer to similar components. However, the grating 25 is constructed as a grooved raster with triangular groove cross-section (see FIG. 4a). Since the flanks of the grating grooves display alternately different inclinations, the splitting up of energy between the object image components displaced relative to one another by half a grating constant is generated by the different light diffraction of neighboring flanks. In contrast to FIG. 3, here the splitting up takes place transversely of the direction of groove length. Diaphragms 15' and 16' have here, in connection with the objectives 13' and 14', the purpose of defining the detection directions of the photoelectric detectors 6 and 7 in single valued manner so as to be unambiguous.

In FIG. 5 an arrangement is represented, which permits measurement in two coordinate directions. As shown, here in the light bundle 1 coming from the object, behind the objective 2 a raster is connected. This raster has a plurality of pyramids 27 of similar kind formed on a carrier 26, which are disposed beside one another with the edges of their base surfaces parallel to one another (FIG. 5a). By the normals of the pyramid surfaces, in the plane of the grating two pairs of directions are defined. Four photoelectric detectors 28 to 31 are associated with these two pairs of directions. It is therefore possible to measure in two directions not parallel to one another in the grating plane by means of this grating. This may be of advantage, in particular, when periodic image structures, such as those similar to a slat fence, occur in one coordinate direction. Furthermore, with the aid of this grating arrangement for each coordinate direction a pair of push-pull signals may be produced, which permit the elimination of constant light components from the measurement signals obtained.

In FIG. 6, an objective 2 images an object in the plane of a focusing screen 3 of prismatic form. The splitting of energy between two respective object image points displaced relative to one another by half a grating constant is effected by the different diffractions given by the prisms. Thus, laterally displaced, partially superposed exit pupils 28', 29', 30' and 31' (FIG. 7) are produced. The outwardly disposed pupil parts not used for direct observation by means of an eyepiece 59 are imaged by means of objectives 57 and 58 in planes in which diaphragms 15 and 16 limiting the measurement field are situated. These are so dimensioned, that for example a face to be measured, at a distance of 1.20 meters to 2.0 meters, corresponds to the size of the diaphragm aperture, when medium focal length objective 2 is used. Collecting lens elements 13 and 14 connected behind the diaphragms 15 and 16 conduct the light penetrating the diaphragms to respective photoelectric detectors 6 or 7, the output signals of which are switched to a push-pull amplifier 8. An indicating device 9 for the indication of the maximum difference signal of the detectors 6 and 7 is disposed at the output of the amplifier 8. Simultaneously, the output of the amplifier 8 is connected via a switch 10' with a servo 10, which by closing of the switch 10' is put into operation and displaces the objective 2 along the optical axis until focusing is obtained on the sighted object.

The so far described arrangement permits the achievement of initial coarse focusing by hand in a fast motion drive mode, with observation of the instrument 9, and then fine focusing is achieved by closing the switch 10'.

It is also possible to connect at the output of the amplifier 8 in place of the indicating instrument 9 a flashing light device which generates flashing light signals laterally outside, or even within, the image field of view. Simultaneously the physiological property of the strong sensitivity to variable light intensities of the rods disposed laterally on the retina of the human eye is used.

In FIG. 6, the arrangement shown is one for focusing according to only one coordinate direction perpendicular to the optical axis. It is, however, possible by fitting a pair of detectors turned by 90° relative to the pair of detectors shown, to include a second coordinate direction in the measurement. This is necessary when the object measured shows a periodic structure parallel to one coordinate direction.

To obtain still more unequivocal signals, the focusing screen 3 can be constructed aperiodically.

FIG. 7 shows in a view from below towards the focusing screen the position of the pupils obtained from the design of the focusing screen of the arrangement shown in FIG. 6. The eyepiece 59 is situated in the part of the ray diagram in which the beams corresponding to the four subsidiary pupils overlap each other. On the other hand, the two photoelectric detectors 6 and 7 are so disposed in space, that they can be acted upon only by rays from a respective pupil.

Since alternating signals are easier to process, and in particular to amplify, than direct current signals, the measurement signals are preferably obtained in the form of alternating current signals. For this purpose, as shown in FIG. 8, the focusing screen can be mounted elastically by means of resilient wires or filaments 60. With each of the coordinate directions determined by the pairs of photoelectric detectors a drive mechanism in the form of a piezo-electric rod 18, acting on the focusing screen, is associated. This piezo-electric rod is fed by a generator to displace the focusing screen into oscillating motion. The arrangement shown in FIG. 8 is provided for oscillating movements in two directions perpendicular to one another.

Figure 9:
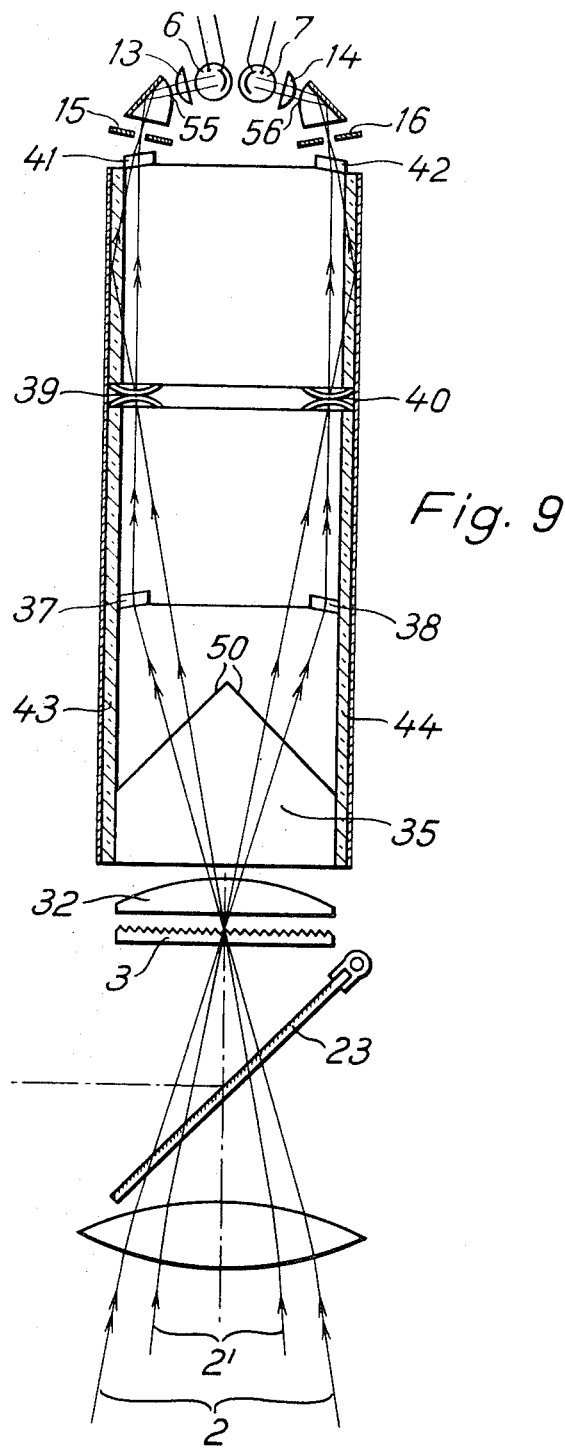
FIG. 9 is a cross-section view showing an embodiment of the ranging system mounted in a reflex camera having an extended representation of the beam path in a pentaprism.
Figure 10:
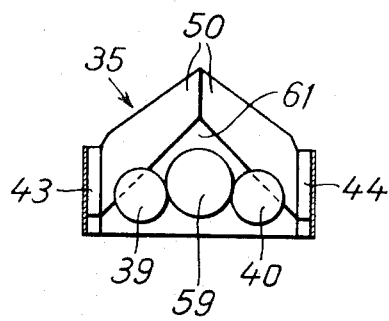
FIG. 10 shows a rear view of the pentaprism of FIG. 9.
Figure 12:
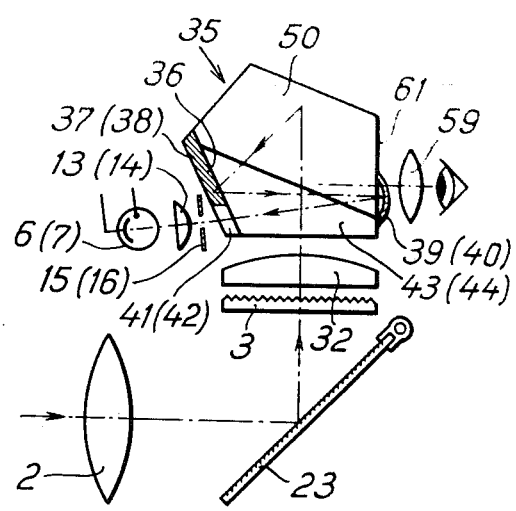
FIG. 12 shows a side view of the beam path in the pentaprism of FIG. 9.
Figure 11:
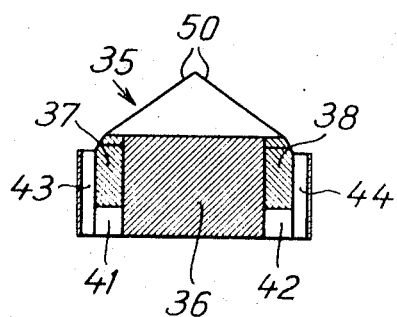
FIG. 11 shows a front view of the pentaprism of FIG. 9.

FIGS. 9 to 12 show an embodiment of the ranging system in a reflex camera. A slightly modified pentaprism 35 with a roof edge, for example of known kind, is employed to use the measurement base lines of two objectives 2 and 2' of different apertures. The measurement light in each case is fed to two photoelectric detectors 6 and 7. In FIG. 9 the beam path in the pentaprism 35 is shown substantially elongated, but in FIG. 12 on the other hand it is shown in bent form in side elevation. FIGS. 10 and 11 show further views of the prism 35.

After passing through the objective 2, the rays furthest from the optical axis pass via a mirror 23 to the focusing screen 3. They then pass through a field lens 32 and are reflected successively at the roof surfaces 50 of the pentaprism 35, at two mirrors 37 and 38 cemented on upper sides of the prism surface 36, and at two concave mirrors 39 and 40 fitted to the prism surface 61. They pass again to the prism surface 36 laterally downwardly, where they pass out at exit apertures 41 and 42 underneath the mirrors 37 and 38 for the intermediate imaging in the planes of the diaphragms 15 and 16, as already described with reference to FIG. 1. The collecting lenses 13 and 14 image the exit pupils on the photoelectric detectors 6 and 7. The exit pupils are associated with the partial sections of the exit pupil parts of the objective 2 (FIG. 12) at the positions of the mirrors 39 and 40. Between the mirrors 39 and 40 the beams (FIG. 12) corresponding to the region of the superimposed area of the auxiliary pupils pass out through the prism surface 61 and serve, in conjunction with the eyepiece 59, for visual observation.

In FIG. 9, the rays corresponding to an objective 2' with a smaller aperture are designated with a single arrow, and those corresponding to the objective 2 with a larger measurement base line and aperture with a double arrow. The first beams have, in contrast to the last mentioned ones, after reflection at the concave mirrors 39 and 40, an additional total reflection at plates 43 and 44 (FIG. 11, these plates are cemented laterally on to the prism 35) in consequence of their lower divergence, before they likewise pass out at the apertures 41 and 42. From there, the light arrives at totally reflecting prisms with collecting exit surfaces 55 and 56 (FIG. 9). The purpose of this is to reflect only the light of the measuring beams from the region 39 and 40, and on the other hand to let the undesired beams with smaller inclinations to the vertical on the reflecting surface pass through unreflected from the region of the eyepiece 59. The light passes to the photoelectric detectors 6 and 7 via the collecting elements 13 and 14 connected behind the prisms.

Figure 13:
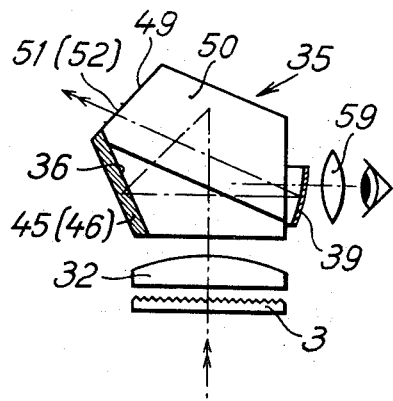
FIGS. 13 and 14 show another embodiment of the guiding arrangement for a beam in the pentaprism with a roof edge used in FIG. 9.
Figure 14:
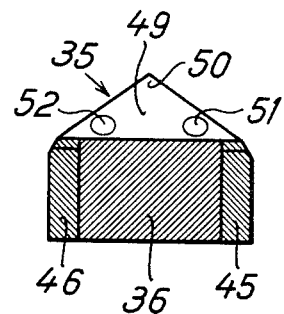

FIGS. 13 and 14 show another possibility for beam guiding in the pentaprism 35 with a roof edge. As in the case represented in FIGS. 9 to 12, here the beams of greater aperture (shown by double arrows) are reflected at two mirrors 45 and 46 fitted to the prism surface 36, which however, in contrast to the mirrors 37 and 38 (FIG. 11), cover the entire height of the prism surface 36. Subsequently, these beams strike the concave mirrors 39 and 40, which however in this case are so inclined that the light can pass out through the surface 49, at 51 and 52, instead of through the apertures 41 and 42. The beams of smaller aperture pass in this case likewise via the mirrors 45 and 46 situated on the surface 36 to the concave mirrors 39 and 40, but then are guided to the apertures 51 and 52 via the roof surfaces 50, instead of via the plates 43 and 44 (FIG. 11).

In the case of an arrangement with a switch for closing the control current circuit for the drive carrying out the focusing movement, a second switch can be connected or coupled, which puts an illumination measuring arrangement situated in the camera into operation. Thereby, it is ensured that the same image field is used for rangefinding and for illumination measurement.

All embodiments illustrated are shown in transmitted light configuration, i.e., with all shown embodiments the gratings are constructed to be transparent and the photoelectric detectors are situated, seen in the direction of incidence of the light, behind the gratings. For all embodiments, however, corresponding gratings may be produced, which carry out the functions of reflection gratings, the photoelectric detectors then being disposed in front of the gratings.

A possible advantage of the above described arrangements resides in that they may be realized with a low expenditure of cost. They may be employed for example in photographic cameras, in copying apparatus, in microscopes or in surveying apparatus.

In place of the single grating shown in each case, in some arrangements two or more gratings can be provided. Thus it is for example possible to replace the pyramid raster shown in FIG. 5 by two gratings according to FIG. 4a crossed relative to one another at 90° and arranged to be staggered in the direction of the optical axis. Thereby, the base for the individual grating markings can be chosen differently. It is also possible to so disposed two gratings relative to one another, that they are staggered in the direction of the optical axis but their coordinate directions associated with the markings coincide. In this case, the two gratings are distinguished by their graduation period. A further variant for the application of two gratings is such that two gratings of equal graduation period are orientated in the same coordinate direction. The splitting angles of the two gratings however are different from one another.

The described arrangements are versatile in application, and only a small commerical expenditure may be necessary.

In place of two photoelectrid detectors, for each coordinate direction only a single photoelectric detector may be provided, which is associated alternately with the two imaging beam components.

We claim:
1. An optical ranging system comprising:
   means for converging light rays from an object and projecting an image of the object to a plane of maximum amplitude in a given space;
   means for diffracting and splitting located within said space for generating a local frequency component of the image and splitting it into a plurality of components;
   means for photoelectrically detecting at least part of each of the components and generating signals equal to said local frequency; and
   means for indicating the position of said plane of maximum amplitude of the local frequency component responsive to said signals.

2. The system of claim 1, wherein said means for converging is an objective and said means for diffracting and splitting comprise a polarizing splitter, a grating and a polarization analyser wherein said polarizing splitter is positioned between the objective and the grating and the polarization analyser is positioned between the grating and said means for photoelectrically detecting.

3. The system of claim 1, wherein said means for converging is an objective and said means for diffracting and splitting comprise a dispersion prism, a grating and a color analyser wherein said dispersion prism is positioned between the objective and the grating.

4. The system of claim 1, wherein said means for converging is an objective and said means for diffracting and splitting comprise a grating having successive rows of prisms, the prisms each being of saw tooth configuration, the apical edges of the prisms of each row being parallel to each other and perpendicular to the direction of the length of that row, the prisms of each row each being of opposite orientation to the prisms of the adjacent row.

5. The system of claim 1, wherein said means for converging is an objective and said means for diffracting and splitting comprise a grating having a plurality of mutually parallel grooves of triangular cross-section.

6. The system of claim 5, wherein the grooves are defined by a plurality of prismatic elements carried by a support.

7. The system of claim 1, wherein said means for converging is an objective and said means for diffracting and splitting comprise a grating having a plurality of geometrically similar pyramids having corresponding edges of their base surfaces parallel to one another.

8. The system of claim 7, wherein said means for detecting comprise individual photoelectric detectors to receive radiation from respective sets of corresponding surfaces of the pyramids.

9. The system of claim 1, wherein said means for converging is an objective and said means for photoelectrically detecting include a plurality of photoelectric detectors, an individual optical system of positive power and an individual alignment diaphragm disposed relative to each of the detectors whereby radiation from a peripheral portion of the objective is received by each detector.

10. The system of claim 9, wherein two such peripheral portions are diametrically opposite to one another.

11. The system of claim 1, wherein said means for indicating includes positioning means to vary the relative position of the objective and the grating under the control of the electrical signals.

12. The system of claim 1, wherein said means for indicating is a dial instrument.

13. The system of claim 1, wherein differential amplifying means are connected to the outputs of the detecting means.

14. The system of claim 13, wherein an optical flasher is connected to the output of the amplifying means.

15. The system of claim 1, wherein said means for diffracting and splitting comprises a focusing screen in a reflex camera having an eyepiece to permit visual observation of the screen.

16. The system of claim 15, comprising beam deflecting means between the screen and the detecting means.

17. The system of claim 16, wherein the deflecting means comprises a pentaprism.

18. The system of claim 17, comprising individual concave reflectors attached to the pentaprism in the paths of the radiation constituting at least part of each of the respective components to the detecting means.

19. The system of claim 16, wherein the objective is removably mounted and the deflecting means being capable of accommodating radiation from an objective of selectable aperture range, 20. The system of claim 15, comprising mounting means mounting the screen resiliently relative to a support, and moving means to move the screen relative to the support in at least one coordinate direction.

21. The system of claim 15, wherein the screen comprises an aperiodic raster.

22. The system of claim 1, wherein the detecting means comprise a plurality of pairs of photoelectric detectors, switching means being provided to switch individual pairs of the detectors selectably into and out of operation.

* * * * *